Patented Dec. 1, 1936

2,062,680

UNITED STATES PATENT OFFICE 2,062,680

4.6 - DIAMINO 2 - ALKYL PYRIDINES AND PROCESSES FOR PRODUCING THE SAME

Herman J. Schneiderwirth, Laurelton, N. Y.

No Drawing. Application March 3, 1936, Serial No. 66,798

9 Claims. (Cl. 260—42)

My invention relates to diamino pyridines and their process of production and refers particularly to 4.6 diamino 2-alkyl pyridines and processes for their production.

I have found that these previously unknown derivatives of pyridine can be produced by the action of sodamide upon 2-alkyl pyridine according to the processes herein described.

Without limiting myself to any particular form of apparatus, I prefer to use a covered steel container, having a stirrer therein, a pipe extending from within the upper portion of the container and connected with a reflux condenser, means for the introduction of a pyridine compound, and a closed pipe line reaching into the lower part of the container holding a thermometer. This apparatus is similar to those usually employed for similar operations.

I give the following as examples of the following of my process for the production of the new pyridine compounds specified:

EXAMPLE 1

4.6 diamino-2-methyl pyridine 95 grams sodamide are finely ground, placed in the container, and the cover placed in closed position. The sodamide is heated slowly to about 120° C. and 100 grams of 2 methyl pyridine are slowly added. At a temperature of about 125° C., the stirrer is put in operation and the evolution of hydrogen commences, the gas passing through the reflux condenser. The stirring is continued for about 8 hours, during which period the temperature is gradually raised to about 220° C. The operation is then continued for a further period of from 8 to 10 hours, or until the evolution of hydrogen ceases, the temperature being gradually raised from 220° C. to about 310° C. The mixture is now allowed to cool to about 100° C. and about 400 c. c. of water is gradually added while maintaining a temperature of about the boiling point for 1 hour, or until the decomposition of the product has been completed. The mixture is now cooled, by placing it upon ice or otherwise, until a black more or less solid crystalline cake separates from an aqueous solution of sodium hydroxide and sodium carbonate. The dark crystalline cake is removed and treated with benzene, toluene, or other suitable organic solvents and heated and the solution separated from the insoluble matters, and purified while heated by charcoal filtration. When this hot solution is cooled, light, partially transparent plates crystallize out and are separated from the solution.

I have found that these crystals consist of a mixture of 3.6-diamino-2-methyl pyridine and 4.6-diamino-2-methyl pyridine in varying proportions dependent upon the particular conditions during the following of the above-described process.

The 4.6-diamino-2-methyl pyridine can be readily separated from the 3.6-diamino-2-methyl pyridine by fractional crystallization or fractional vacuum distillation. When 20 grams of the crystals obtained as above are dissolved in about 100 c. c. of toluene or benzene by heating and the solution thus formed is cooled to about 10° C., crystals of 3.6-diamino-2-methyl pyridine separate from the solution and, when the solution is further reduced in temperature, as for instance to 1° C., crystals of 4.6-diamino-2-methyl pyridine separate.

These crystals of 4.6-diamino-2-methyl pyridine are in the form of light shiny plates having a melting point of 52°–53° C. They are soluble in water, alcohol, acetone, benzene, toluene, chloroform, and glycerine and insoluble in mineral oil and carbon tetrachloride. The aqueous solution reacts alkaline. The graphic formula of the product is

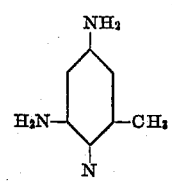

EXAMPLE 2

4.6-diamino-2-propyl pyridine

This compound can be obtained by substituting approximately the same amount of 2-propyl pyridine for the 2-methyl pyridine given in Example 1 and following the steps of that example. The product thus formed forms bushy needles (not plates) arranged in rosette-like formation. The melting point is 106° to 107° C. The product is soluble in hot water, alcohol, acetone, benzene, toluene, ether, glycerine, and fatty acids; slightly soluble in cold water; insoluble in mineral oil. The graphic formula of the product is

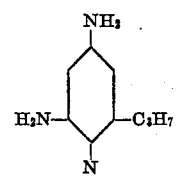

While I have given examples of only the methyl and propyl compounds, I do not limit myself to these particular alkyl compounds as other similar 2-alkyl compounds such as the ethyl, butyl, and amyl compounds, and others, may be employed.

All of the 4.6-amino-2-alkyl-pyridines included within my invention are capable of forming valuable dyes when coupled with diazotized and tetrazotized amines of the aromatic series.

I do not limit myself to the particular chemicals, quantities, times, temperatures, or steps of procedure specifically mentioned, as these are given simply as a means for clearly describing my process and the results produced thereby.

What I claim is:

1. In a process for the production of 4.6 diamino 2-alkyl pyridine, the steps which consist in heating a mixture of 2 alkyl pyridine with sodamide to not less than 200° C., adding water, and isolating the thus produced 4.6 diamino 2-alkyl pyridine.

2. In a process for the production of 4.6 diamino 2-alkyl pyridine, the steps which consist in heating a mixture of one molecule of 2 alkyl pyridine with two molecules of sodamide to a temperature not less than approximately 200° C., adding water, and isolating the thus produced 4.6 diamino 2-alkyl pyridine.

3. In a process for the production of 4.6 diamino 2-picoline, the steps which consist in heating 6 amino 2-picoline with sodamide to a temperature not less than approximately 200° C., adding water, and isolating the thus produced 4.6 diamino 2-picoline.

4. In a process for the production of 4.6 diamino 2-picoline, the steps which consist in heating 6 amino 2-picoline with sodamide, to a temperature not less than approximately 200° C., adding water, and isolating the thus produced 4.6 diamino 2-picoline.

5. In a process for the production of 4.6 diamino 2-alkyl pyridine, the steps which consist in heating a mixture of not less than two molecular parts of sodamide with one molecular part of 2 alkyl pyridine, heating the mixture gradually to approximately 125° C., raising the temperature to approximately 160° C., maintaining this temperature for about 12 hours raising the temperature to not less than 200° C., retaining this temperature for approximately 10 hours, adding water, and separating the thus produced 4.6 diamino 2 alkyl-pyridine.

6. In a process for the production of 4.6 diamino 2-picoline, the steps which consist in heating a mixture of not less than two molecular parts of sodamide with one molecular part of 2-picoline, heating the mixture gradually to approximately 125° C., raising the temperature to approximately 160° C. maintaining this temperature for about 12 hours, raising the temperature to not less than 200° C., retaining this temperature for approximately 10 hours, adding water, and separating the thus produced 4.6 diamino 2-picoline.

7. 4.6 diamino 2-alkyl pyridine.
8. 4.6 diamino 2-picoline.
9. 4.6 diamino 2-propyl pyridine.

HERMAN J. SCHNEIDERWIRTH.